April 13, 1926.　　　　　　　　　　　　　　1,580,920
M. E. ROE
WHEEL
Filed May 6, 1921　　　　3 Sheets-Sheet 1

Fig. 7　　MAYO E. ROE　　INVENTOR.

BY Richey Slough & Fales

HIS ATTORNEYS.

April 13, 1926.

M. E. ROE 1,580,920

WHEEL

Filed May 6, 1921

MAYO E. ROE   INVENTOR.

BY Richey Slough & Fales

HIS ATTORNEYS.

Patented Apr. 13, 1926.

1,580,920

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

WHEEL.

Application filed May 6, 1921. Serial No. 467,425.

*To all whom it may concern:*

Be it known that I, MAYO E. ROE, a citizen of the United States, residing at Elyria, in the county of Lorain and State of Ohio, have invented certain new and useful Improvements in Wheels; and I do hereby declare the following to be a full, clear, concise, and exact description of the invention, such as will enable those skilled in the art to which it appertains to make and use the same.

This invention relates to an improved wheel of the character described, which is strong and durable, and which may carry on its outer periphery a rubber tire, and which may be used wherever a wheel of this character is desired. However, the design of my wheel is such as enables it to be used with success on hand-trucks and like vehicles, where heavy loads are to be carried and where often the wheel is employed as a caster wheel.

It is an object of my invention to provide such a wheel designed to accommodate a rubber tire of either circular cross-section or square-faced cross-section, with a semi-circular base.

It is a further object of my invention to provide a wheel equipped with an adjustable self-contained ball-bearing, so constructed that the wheel can be removed from its supporting bracket without disturbing the bearing.

A further object of my invention is to provide such a wheel wherein the tires may be replaced without disturbing the bearings.

Another object is the provision of a wheel with self-contained ball-bearings, so designed that various sizes of stationary axles can be used with the same design of bearing.

Another object of my invention is to provide an improved rubber tire construction, which will cooperate with the tire seat provided by the wheel, in such a way that "creeping" of the tire on the rim of the wheel is substantially eliminated.

Other objects of my invention and the invention itself will be more apparent by reference to the drawings which are a part of this specification, and in which drawings Fig. 1 shows a side elevation of a wheel embodying my invention.

Fig. 7 shows a perspective view of the tire core with the enclosing rubber tire body shown in phantom perspective.

Figures 1, 2:
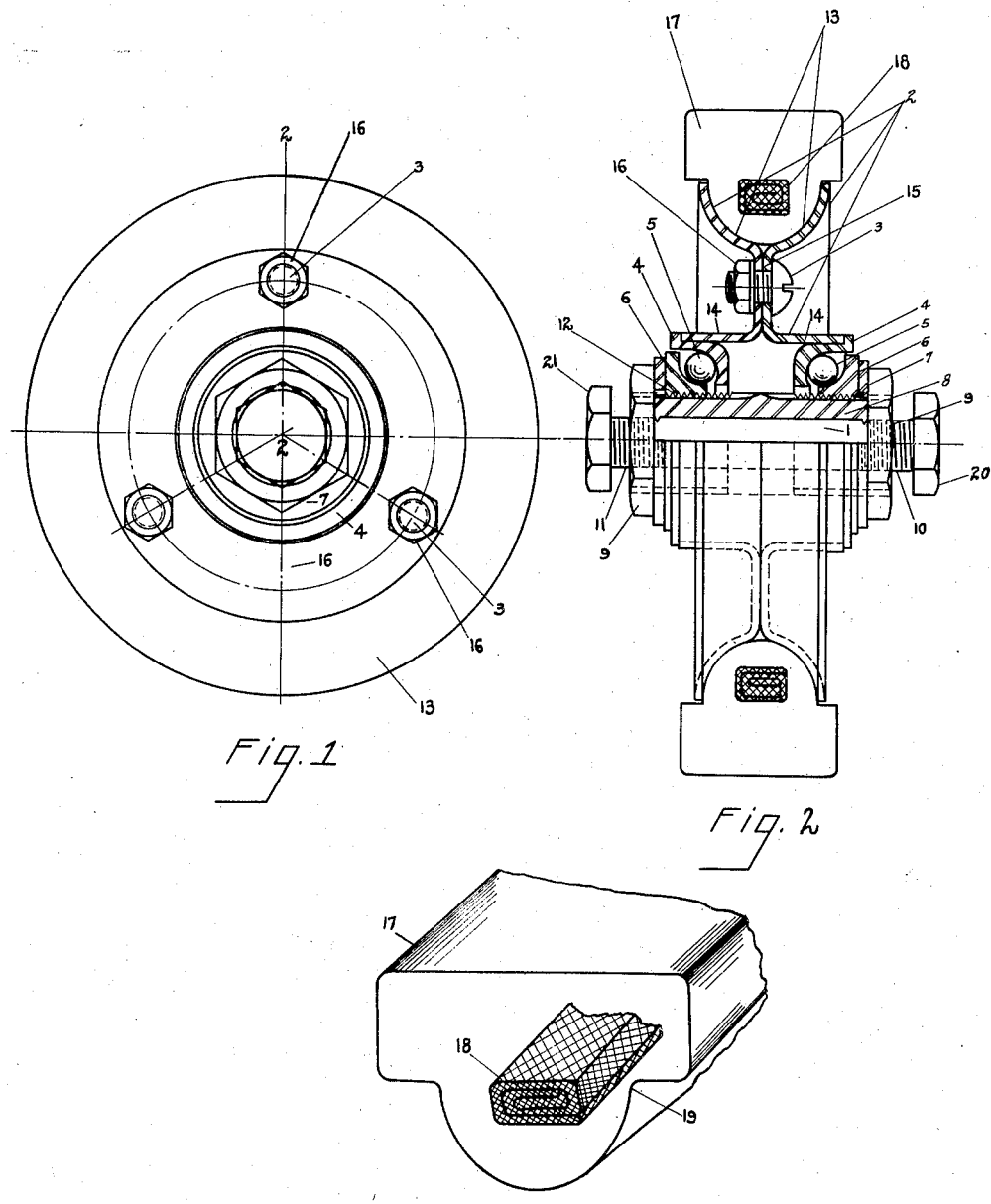
Fig. 2 shows an end elevational view with the upper half thereof shown in cross-section of the wheel illustrated in Fig. 1, the portion shown in section being viewed from the line 2—2 of Fig. 1. In this figure also a sectional view of the tire carried by the wheel is shown.

Referring now to the drawings, in all of which like parts are designated by like reference characters, and referring now particularly to that embodiment of my invention illustrated in Figs. 1 and 2, and more generally to the embodiments illustrated in the other figures which employ a number of the same elements as the embodimnt of Figs. 1 and 2, at 1 I show a wheel axle threaded at 10 and 11 on either end and upon which axle a bearing supporting hollow axle is carried, ball-bearing cone nuts 6 provided near each end of the supporting hollow axle 8 being threaded thereon at 12. Annular ball-bearing cup members 4 and bearing balls 5 are provided, the members 4 becoming the outer race and the cone members 6 becoming the inner race of a ball-bearing assembly, the races 4 and 6 being spaced apart by the balls 5 disposed within the races.

The outer race members 4 have an outwardly extending flange portion, which again at its end carries a peripheral flange.

At 2 is shown a pair of wheel members, comprising rim portions 13 and outer hub portions 14, said rim portions and hub portions being joined together, in the embodiment illustrated, by an interconnecting portion 15 of relatively short length, the portions 15 being perforated at intervals, bolts 3 passing through aligned perforations of the two wheel members to tightly, but removably, secure the member 2 together. The hub comprises portions 14 extending substantially at right angles to the portions 15 and outwardly therefrom, resting upon the flattened top surface of the races 4 and within the peripheral outer flanges thereof. The annular race members 4 are of such size that the portions 14 will tightly fit thereon so that when the bolts 3, by means of their threaded ends and the nuts 16 are tightened up to tightly clamp the members 2 together, the members 2 with the outer race members 4 will form a rigid wheel structure carried on the cones 6 through the intervening weight supporting bearing balls 5, the cone members 6 in turn being suitable adjusted so as to prevent end play of the wheel so formed with reference to the cone members by screwing the cone members upon the threaded bearing supporting hollow axle member 8 and clamping the cone members 6 in such proper adjusted position by means of the nuts 9 screw-threaded on the threaded ends 10 and 11 of the hollow axle member 8, a tongued lock washer 7 being interposed.

The tire 17 is carried on the outer curved face of the rim portions 13 of the members 2, and it is one of the objects of my invention to specially construct the rubber tire 17 so as to not only enable it to perform efficiently the useful functions of a rubber tire, but also to increase the durability and general serviceability of the tire by preventing "creeping" of the tire on the tire rim. This I accomplish by embedding within the rubber body of the tire 17 a core 18, said core being perhaps best illustrated in Fig. 7, showing a perspective view of a section of such core, the enclosing rubber body of the tire being merely indicated in phantom, so as to indicate roughly the relative positioning of the core and tire body. It will be seen by referring particularly to Fig. 7, which shows my preferred form of tire construction that the same comprises at 18 a tire core which, as illustrated, is seen to be constructed of a sheet of fabric rolled tightly and the roll flattened, so that it will be substantially rectangular, as shown, or of oval cross-section. The top surface of the core is preferably substantially level, or slightly below the highest portions of the tire rim engaging surface 19, which is in the embodiment illustrated substantially semi-circular in vertical cross-section, such a core being preferably joined at each end by having its ends sewed together, or in any other suitable way, as by riveting over-lapping dove-tailed portions of the different layers comprising the two ends. I find that such a fabric core is preferable to a wire core, in that intimate union of rubber and metal is very difficult to obtain in practice, whereas the rubber and the fabric unite very much more readily, the rubber folding into the interstices of the fabric and making a very close connection.

Such a wheel as just described may now be secured to a supporting bracket, where this is desired, by placing the forks of the bracket over the outside of the nuts 9 and permitting the threaded ends 10 and 11 of the axle 1 to project through a perforation or slot in the ends of the fork and by turning up the nuts 20 and 21, so that the forks may be tightly secured to the inner race of the ball-bearing assembly. The ball-bearing mechanism contained in this wheel is self-contained and various sizes of stationary axles, such as the axle 1, can be used with the same design of bearing, by only varying the size of the hole in the hollow bearing supporting axle 8.

Whenever it is desired to change a tire on this wheel, this may be accomplished by removing the screws 3 and dismantling one side of the bearing assembly. Since this wheel is capable of very rough use and often subjected to severe side strains, the outwardly extending portions 13 and 14 are made of considerable rigidity and the intermediate portion 15, which extends in a vertical direction is stiffened in the embodiment illustrated by the clamping bolts 3 with washers 16, and may be further stiffened when desirable, especially when the wheels are made of larger diameter, by additional clamping bolts and washers, or in any well known way.

The above construction described as for a specific embodiment of my invention may be varied, and I contemplate other embodiments in which the intermediate portion 15 may be of greater longitudinal length, in which case it will be strengthened by the presence of other additional clamping bolts and washers, or other equivalent stiffening or bracing means; also the bolts may be placed at any desired number of points on the wheel to secure the result sought.

Figure 3:
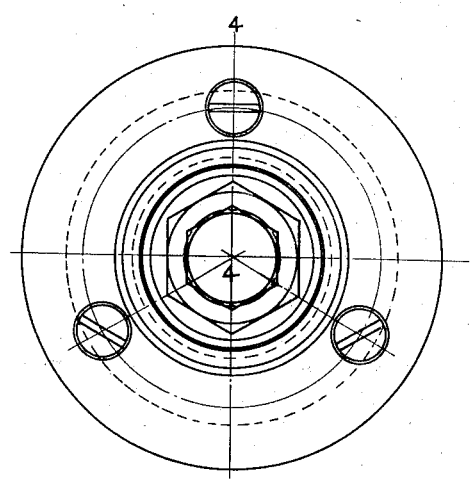
Fig. 3 shows a side elevational view of a second embodiment of my invention.
Figure 4:
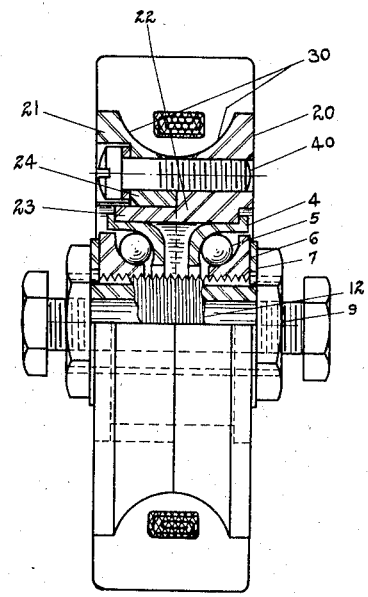
Fig. 4 shows an end elevational view of the embodiment illustrated in Fig. 3, the upper portion being shown in sections, the sectional view being had on the line 4—4 of Fig. 3. In this figure the carried tire is shown in section.

A second embodiment of my invention is shown in Figs. 3 and 4 and comprises the same axle and ball-bearing arrangement as illustrated in the embodiment just described, means being provided, however, in the second embodiment illustrated in Figs. 3 and 4, to remove a tire without disassembling any part of the ball-bearing structure.

Instead of the sheet metal discs 2 of Fig.

2, 1 now provide a pair of wheel members 20 and 21, providing on their outer face a curved tire seating surface 30, the two members being telescoped, the member 20 having an inwardly extending flange 22 and this flange having a further inwardly extending flange 23. The member 21 has an inwardly extending flange 24 adapted to fit over the outer face 23 of the member 20, and up against the opposing end face of the flange 22 thereof. Both members 20 and 21 are alike perforated, preferably at equi-distant points, to admit a machine screw 40, the member 20 having its perforation screw-threaded, so as to co-operate with the threads on the screw 40, and the member 21 having its perforation of such size as to provide a clearance space for the threaded end of the screw. The two members are tightly clamped together by the screw 40 passing through the member 21 and being screwed into the perforation through the member 20.

The tire, which may be preferably constructed as illustrated in Fig. 7, is carried on the tire seat surface 30 in the manner described for the tire of Fig. 2. The member 20 by its flanged portions 22 and 23 rests upon the upper flattened surface of the bearing cup rings 4 and between the peripheral flanges at the outer ends thereof. In the wheel of this embodiment it will be seen that by removing the screws 40, the member 21 can be removed from the wheel and the tire removed sidewise from the remaining member 20 which remains in assembled position upon the bearing.

Figure 5:
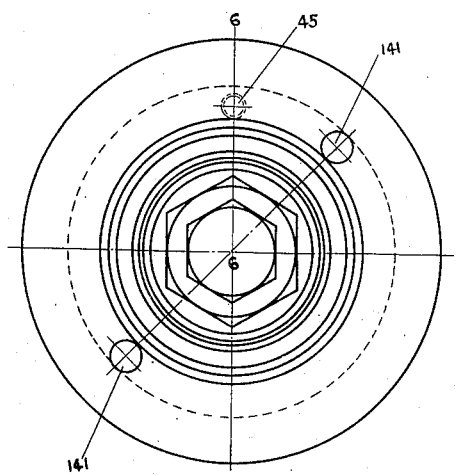
Fig. 5 shows a side elevational view of another embodiment of my invention.
Figure 6:
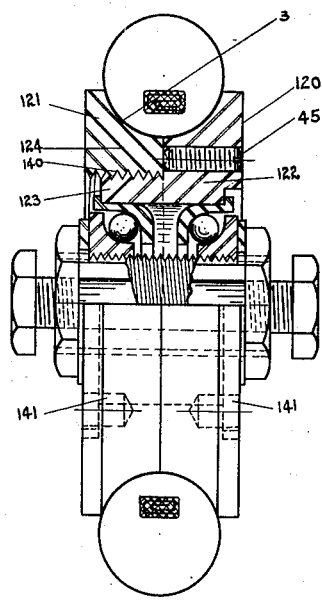
Fig. 6 shows an end elevational view, the upper half being shown in cross-section, the section being taken on the line 6—6 of Fig. 5. In this embodiment a tire of circular cross-section is shown carried on the wheel in cross-sectional view.

Referring now to the embodiment illustrated in Figs. 5 and 6, which is constructed the same in many respects as the wheel of the other embodiments, this wheel also is provided with telescoped wheel rim portions 120 and 121, the member 121 having a flange portion 124 which overlaps an underlying flange 123 which is an inward extension of an inwardly extending flange 122 of the member 120. The principal difference between the embodiment illustrated in Figs. 5 and 6 and that in Figs. 3 and 4 is that instead of securing the two members together by a machine screw, such as the machine screw 40 of Figs. 3 and 4, in the present embodiment the two members are directly screwed together by means of adjacent co-operating threaded surfaces 140, there being provided on each member depressions 141 to admit a spanner tool, so that the members can be tightly screwed together. A set screw 45 is provided extending through a threaded aperture in one of the members—in this case 120—and which engages the inner end face of the member 121 to prevent relative rotation of the members. In this embodiment also the tire may be removed without disassembling the bearing mechanism, which preferably will be the same as that illustrated in the figures showing the other embodiments. In this embodiment, instead of showing a tire having a square-faced cross-section with a semi-circular base, I herein show a tire having a circular section, the disposition of the non-stretchable fabric core being similar to that of the other tire. It will be understood, however, that either kind of tire may be used in connection with any of the embodiments illustrated, or any tires having different kinds of treads may be so used, it being, however, one of the objects of my invention, as before stated, to so construct the tire and to have the dimensions of the rim tire seat and the rim engaging tire surface of such relative sizes as to prevent "creeping" of the tire in the manner described, the inside diameter of the tire being normally less than the least diameter of the curved tire seat.

Having thus described my invention in several embodiments, it will be understood that numerous and extensive departures may be made from the details of construction in the embodiments herein illustrated and described, but without departing from the spirit of my invention.

What I claim is:

1. In a wheel of the class described, the combination of a rim comprising separable sections adapted to be secured together to provide an annular peripheral transversely curved tire seat, of a tire comprising an annular rubber body portion having a fabric core, said core being of relatively slight resiliency, the inner face of said tire being normally curved on a shorter radius than the adjacent portion of the rim seat with which it is adapted to contact when assembled therewith the assembly of the rim sections with the tire therebetween causing the body of the tire between the core and tire seat to be compressed when the rim sections are secured in assembled relation.

2. In a wheel of the class described, the combination of a rim comprising separable sections adapted to be secured together to provide an annular peripheral transversely curved tire seat, of a tire comprising an annular rubber body portion having a fabric core formed of sheet material, said core being of relatively slight resiliency, the inner face of said tire being normally curved on a shorter radius than the adjacent portion of the rim seat with which it is adapted to contact when assembled therewith, the assembly of the rim sections with the tire therebetween causing the body of the tire between the core and tire seat to be compressed when the rim sections are secured in assembled relation.

3. In a wheel of the class described, the combination of a rim comprising separable sections adapted to be secured together to provide an annular peripheral transversely curved tire seat, of a tire comprising an annular rubber body portion having a fabric core formed of rolled sheet material, said core being of relatively slight resiliency, the inner face of said tire being normally curved on a shorter radius than the adjacent portion of the rim seat with which it is adapted to contact when assembled therewith, the assembly of the rim sections with the tire therebetween causing the body of the tire between the core and tire seat to be compressed when the rim sections are secured in assembled relation.

In witness whereof, I have hereunto signed my name this 4th day of May, 1921.

MAYO E. ROE